(12) United States Patent　　　　(10) Patent No.:　US 12,686,435 B2
　Do　　　　　　　　　　　　　　　　(45) Date of Patent:　Jul. 21, 2026

(54) OBSTACLE AVOIDANCE METHOD

(71) Applicants: RENAULT S.A.S., Boulogne Billancourt (FR); NISSAN MOTOR CO., LTD., Kanagawa-ku (JP)

(72) Inventor: Anh-Lam Do, Antony (FR)

(73) Assignees: AMPERE S.A.S., Boulogne Billancourt (FR); NISSAN MOTOR CO., LTD., Kanagawa-ku (JP)

( * ) Notice: Subject to any disclaimer, the term of this patent is extended or adjusted under 35 U.S.C. 154(b) by 183 days.

(21) Appl. No.: 18/263,264

(22) PCT Filed: Jan. 20, 2022

(86) PCT No.: PCT/EP2022/051219
　§ 371 (c)(1),
　(2) Date: Jul. 27, 2023

(87) PCT Pub. No.: WO2022/161845
　PCT Pub. Date: Aug. 4, 2022

(65) Prior Publication Data
　US 2024/0124055 A1　Apr. 18, 2024

(30) Foreign Application Priority Data
　Jan. 27, 2021　(FR) ...................................... 2100740

(51) Int. Cl.
　*B62D 6/00*　　　(2006.01)
(52) U.S. Cl.
　CPC ................................... *B62D 6/001* (2013.01)

(58) Field of Classification Search
　CPC ......... B60W 10/20; B60W 2050/0008; B60W 2050/0012; B60W 2050/0043;
　　　　(Continued)

(56) References Cited

U.S. PATENT DOCUMENTS

2007/0288133 A1* 12/2007 Nishira .............. B62D 15/0265
　　　　　　　　　　　　　　　　　　　701/23
2022/0001860 A1　1/2022 Do

FOREIGN PATENT DOCUMENTS

CN　　111959500 A　11/2020
DE　102009043070 A1 *　3/2011 ......... B60G 21/0558
FR　　3 088 275 A1　5/2020

OTHER PUBLICATIONS

International Search Report issued May 9, 2022, in PCT/EP2022/051219, 2 pages.
　　　　　　(Continued)

*Primary Examiner* — Charles J Han
(74) *Attorney, Agent, or Firm* — Oblon, McClelland, Maier & Neustadt, L.L.P.

(57)　　　　ABSTRACT

A method automatically controls a motor vehicle with wheels including at least two steered wheels. The method includes the following steps: the motor vehicle acquiring parameters relating to an obstacle avoidance trajectory, and a computer computing a provisional control instruction for an actuator for braking the steered wheels, based on the parameters and by way of a closed-loop controller. The method also includes the following steps: acquiring a lateral acceleration or a roll angle to which the motor vehicle is subject, and computing, in open-loop mode, a correction term or the provisional control instruction, based on the acquired lateral acceleration or roll angle.

9 Claims, 3 Drawing Sheets

(58) Field of Classification Search
　　　CPC ....... B60W 2510/20; B60W 2520/125; B60W
　　　　　　　　2520/14; B60W 2520/18; B60W 2520/20;
　　　　　　　　　B60W 2552/30; B60W 30/09; B60W
　　　　　　　　　40/02; B60W 40/109; B60W 40/112;
　　　　　　　　　　　　　　　　B60Y 2300/09
　　　See application file for complete search history.

(56) References Cited

OTHER PUBLICATIONS

Simon Mustaki. "Outils de pre-calibration numerique des lois de commande de systemes de systemes : Application aux aides a la conduite et au vehicule autonome", Jul. 8, 2019, 187 pages, Retrieved from the Internet: https://tel.archives-ouvertes.fr/tel-02297892/document [retrieved on Jul. 13, 2020] XP055714240, p. 68.

* cited by examiner

OBSTACLE AVOIDANCE METHOD

TECHNICAL FIELD OF THE INVENTION

The present invention relates in general to the automation of path following in motor vehicles.

It has a particularly advantageous application in the context of motor vehicle driving aids.

It relates more particularly to a control method for the automated steering of a motor vehicle to allow this vehicle to follow an obstacle avoidance path, notably in a bend.

It also relates to a motor vehicle equipped with a computer suitable for implementing this method.

PRIOR ART

With a view to making motor vehicles safer, these are currently equipped with driving aid systems or autonomous driving systems.

Among such systems, automatic emergency braking (AEB) systems, designed to avoid any collision with obstacles situated in the lane followed by the vehicle are notably known. These systems are designed to detect an obstacle in the lane and to act, in such a situation, on the motor vehicle's conventional braking system.

However, there are situations in which these emergency braking systems are unable to avoid the collision or cannot be used (for example if another vehicle is following too closely behind the motor vehicle).

For these situations, automatic avoidance systems (better known by the abbreviation AES which stands for Automatic Evasive Steering or Automatic Emergency Steering) have been developed and allow the obstacle to be avoided by deviating the vehicle from its path, by acting on the vehicle steering.

However, it sometimes happens that this AES steering, having calculated a path to be followed in order to avoid the obstacle, is unable to guide the vehicle with the desired precision, and this may prove highly dangerous.

Document U.S. Pat. No. 9,731,755 therefore proposes that certain road effects, which are the curvature, the banking and the longitudinal gradient of the road be taken into account in the calculations so that the path following is better.

More specifically, that document proposes calculating a control instruction that minimizes the deviation between the path of the vehicle and the desired path. The instruction used for this purpose comprises a closed loop feedback part and an open loop part which takes account of a road-induced disturbing factor that is determined predictively.

However, even using this technical solution, the path following is not as precise as would be desired.

INTRODUCTION TO THE INVENTION

In order to overcome the abovementioned disadvantage of the prior art, the present invention proposes to solve the problem of avoidance path following by taking the roll and/or the lateral acceleration experienced by the vehicle into account, these having a significant impact on the path taken by the vehicle.

More particularly, the invention proposes a control method for the automated steering of a motor vehicle, comprising steps of:
acquiring parameters relating to an avoidance path whereby the motor vehicle avoids an obstacle,
acquiring a lateral acceleration or a roll angle experienced by the motor vehicle, calculating, using a computer a temporary control instruction for a steering actuator that steers the steered wheels, as a function of said parameters and by means of a closed loop controller, and
calculating, using open loop calculation, a correction term for said temporary control instruction as a function of the lateral acceleration or of the roll angle acquired.

Thus, the close loop controller comprises a static state feedback calculated from the state variables of the vehicle and of the road at an instant t, without the need to make any prediction which might be a source of error.

The open loop correction term is then calculated as a function of the rolling of the vehicle or of the lateral acceleration, in order to take account of the effect of the rolling on the path. This rolling or this lateral acceleration can be measured or calculated.

The correction term may also be calculated as a function of the curvature of the road and of the gains of the closed loop controller.

Thus, other advantageous and nonlimiting features of the method according to the invention, considered individually or in any technically possible combination, are as follows:
the correction term is calculated as a function of a coefficient of steering induced by the rolling of the motor vehicle on the front wheels of the motor vehicle and/or of a coefficient of steering induced by the rolling of the motor vehicle on the rear wheels of the motor vehicle;
the correction term is calculated as a function of the curvature of the road taken by the motor vehicle;
the correction term is equal to the sum of the product of a first variable multiplied by the lateral acceleration or by the roll angle, and the product of a second variable multiplied by the curvature of the road;
the correction term is calculated as a function of at least one of the gains of the closed loop controller;
the correction term is calculated as a function of an understeer gradient;
the understeer gradient is calculated as a function of at least one of the gains of the closed loop controller;
the understeer gradient is calculated by means of the following equation:

$$K_V = \left( \frac{l_r\left(1 - k_\delta - k_{\delta_{ref}}\right)}{C_f} - \frac{l_f\left(1 - k_\delta - k_{\delta_{ref}} + k_{\psi L} - k_\beta\right)}{C_r} \right) \cdot \frac{m}{l_f + l_r},$$

where m, $C_f$, $C_r$, $l_f$, $l_r$ are parameters connected only with the architecture of the motor vehicle, and where $k_\delta$, $k_{\delta_{ref}}$, $k_{\psi L}$ and $k_\beta$ are gains of the closed loop controller;
the correction term is calculated by means of the following equation:

$$K_V = \left( \frac{l_r\left(1 - k_\delta - k_{\delta_{ref}}\right)}{C_f} - \frac{l_f\left(1 - k_\delta - k_{\delta_{ref}} + k_{\psi L} - k_\beta\right)}{C_r} \right) \cdot \frac{m}{l_f + l_r},$$

where:
$l_f$, $l_r$ are parameters connected only to the architecture of the motor vehicle,
V is the longitudinal velocity of the motor vehicle,
$l_s$ is a predetermined sighting distance,
$\rho_{ref}$ is the radius of curvature of the road at the motor vehicle, $\varepsilon_1$ is the coefficient of steering induced by the rolling on the front wheelset, $\varepsilon_2$ is the coefficient of steering induced by the rolling on the rear wheelset, $\Phi$ is the roll angle, Kv is the understeer gradient, $k_\delta$, $k\delta_{ref}$, $k_{\Psi L}$, $k_r$, and $k_\beta$ are gains of the closed loop controller.

The invention also proposes a motor vehicle comprising a steering actuator for steering the steered wheels and a computer for controlling said actuators programmed to implement a method as mentioned above.

Of course, the various features, variants and forms of embodiment of the invention may be combined with one another in various combinations provided that they are not mutually incompatible or mutually exclusive.

DETAILED DESCRIPTION OF THE INVENTION

The description which will follow with reference to the attached drawings, given by way of nonlimiting examples, will make it easy to understand what the invention consists of and how it may be implemented.

Figure 1:
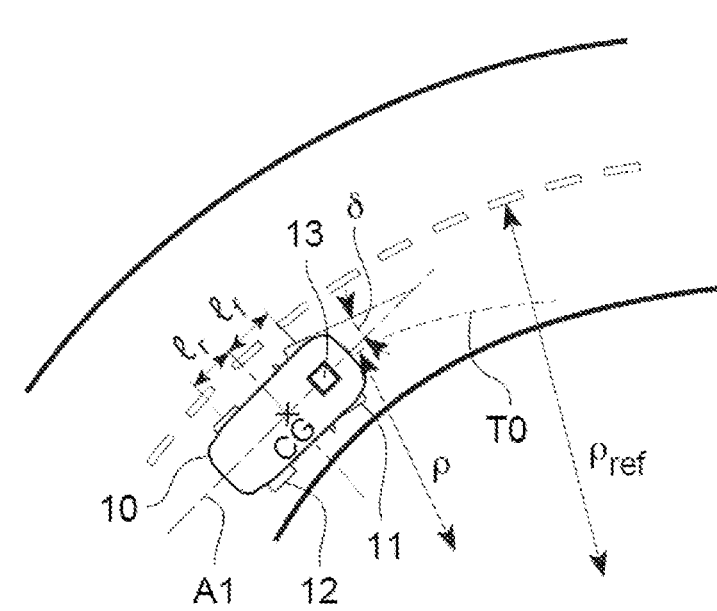
FIG. 1 is a schematic view from above of a motor vehicle driving along a road, on which the path that this vehicle is to take is indicated.

FIG. 1 depicts a motor vehicle 10 conventionally comprising a chassis which delimits a cabin, two steered front wheels 11, and two non-steering rear wheels 12. As an alternative, these two rear wheels could also be steered, although this would then require a modification to the control law described hereinafter.

This motor vehicle 10 comprises at least one conventional steering system making it possible to influence the orientation of the front wheels 11 so as to cause the vehicle to turn. This conventional steering system notably comprises a steering wheel connected to steering links in order to cause the front wheels 11 to pivot. In the example considered, it also comprises an actuator 31 (depicted in FIG. 5) able to influence the orientation of the front wheels as a function of the orientation of the steering wheel and/or as a function of a request received from a computer 13.

In addition, this motor vehicle may also comprise a differential braking system able to act differently on the two front wheels 11 (or even also on the two rear wheels 12) so as to slow the motor vehicle thereby making it turn. Such a differential braking system for example comprises a controlled differential or electric motors placed at the wheels of the vehicle or else brake calipers that are controlled independently of one another. It thus comprises at least one actuator which is designed to act differently on the rotational speeds of the wheels as a function of a request received from the computer 13.

For the sake of the clarity of the explanation, it will be considered here that the vehicle does not have such a differential braking system. If it were provided with one, that would require modifications to the control law described hereinafter.

The computer 13 is intended to control the assisted-steering actuator 31 as a function of the traffic conditions encountered. To this end, it comprises at least one processor, at least one memory and an input/output interface connected to a data network of the vehicle (typically a CAN type of network).

By virtue of its interface, the computer 13 is able to receive input signals coming from various sensors.

Among these sensors, there are for example provided:

a device such as a front camera, able to identify the position of the vehicle relative to its traffic lane, a device such as a RADAR or LIDAR remote sensor, able to detect an obstacle 20 in the path of the motor vehicle 10 (FIG. 2), at least one lateral detection device, such as a RADAR or LIDAR remote detector able to monitor the surroundings to the sides of the vehicle, a device such as a rate gyro, able to determine the yaw velocity (rotation about a vertical axis) of the motor vehicle 10, a steering wheel position and angular velocity sensor, and a torque sensor sensing the torque applied by the driver to the steering wheel.

Using its interface, the computer 13 is able to transmit an instruction to the assisted steering actuator 31.

Figure 2:
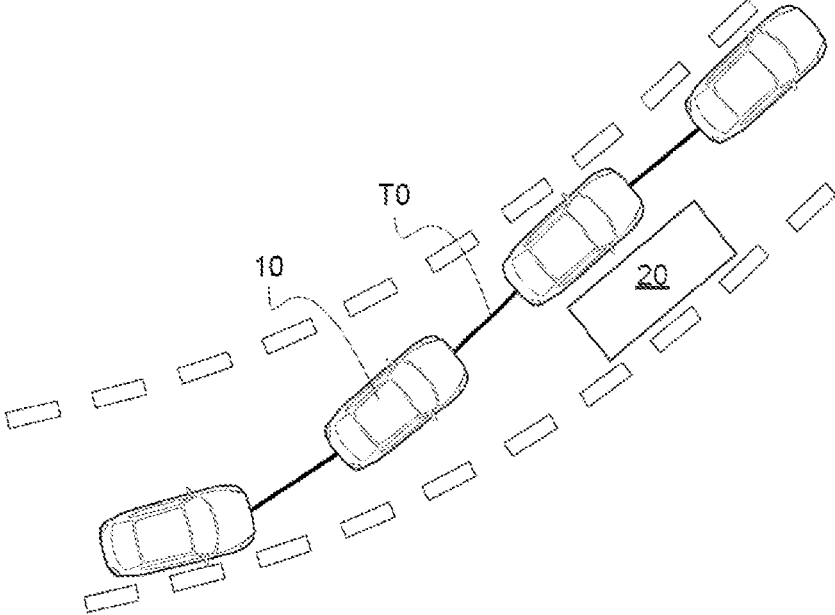
FIG. 2 is a schematic view from above of the motor vehicle of FIG. 1, depicted in four successive positions situated along an obstacle avoidance path.

It is thus able to force the vehicle to follow an obstacle avoidance path T0 to avoid the obstacle 20 (see FIG. 2).

Using its memory, the computer 13 stores data used in the context of the method described hereinbelow.

It notably stores a computer application, consisting of computer programs containing instructions which when executed by the processor allows the computer to implement the method described hereinafter.

Before this method is described, the various variables and data that will be used, some of which are illustrated in FIG. 1, may be introduced.

Consider first of all a frame of reference (CG, X, Y, Z) attached to the vehicle, the origin of which is situated at the center of gravity of the vehicle, the axis X of which coincides with the longitudinal axis A1 of the vehicle (extended from the rear forward), the axis Y of which is a lateral axis (in this instance extending from right to left) and the axis Z of which is an axis that is vertical when the vehicle is on a road which is horizontal.

The total mass of the motor vehicle will be denoted "M" and will be expressed in kg.

The moment of inertia of the motor vehicle about the axis Z will be denoted "J" or "$I_z$" and will be expressed in N·m.

The moment of inertia of the motor vehicle about the axis X will be denoted $I_x$ and will be expressed in N·m.

The distance between the center of gravity CG and the front axle of the vehicle will be denoted "$l_f$" and will be expressed in meters.

The distance between the center of gravity CG and the rear axle will be denoted "$L_r$" and will be expressed in meters.

The cornering stiffness of the front wheels will be denoted "$C_f$" and will be expressed N/rad.

The cornering stiffness of the rear wheels will be denoted "$C_r$," and will be expressed in N/rad.

These cornering stiffnesses of the wheels are notions well known to those skilled in the art. By way of example, the cornering stiffness of the front wheels is thus the stiffness that makes it possible to write the equation $F_f = 2 \cdot C_f \cdot \alpha_f$ where $F_f$ is the sideslip force for the front wheels and $\alpha_f$ is the slip angle for the front wheels.

The steering angle that the steered front wheels make with the longitudinal axis A1 of the motor vehicle 10 will be denoted "$\delta$" and will be expressed in rad.

The variable $\delta_{ref}$, expressed in rad, will denote the saturated steering angle instruction as will be transmitted to the assisted steering actuator.

The variable $\delta_K$, expressed in rad, will denote the unsaturated steering angle instruction. At this stage, it may simply be emphasized that the concept of saturation will be associated with limits on value or on variation in value.

The yaw velocity of the vehicle (about the vertical axis passing through its center of gravity CG) will be denoted "$r$" and will be expressed in rad/s.

The relative heading angle between the longitudinal axis A1 of the vehicle and the tangent to the avoidance path T0 (desired path of the vehicle) will be denoted "$\Psi_L$" and will be expressed in rad.

The lateral deviation between the longitudinal axis A1 of the motor vehicle 10 (passing through the center of gravity CG) and the avoidance path T0, at a sighting distance "ls" situated ahead of the vehicle, will be denoted "$y_L$" and will be expressed in meters.

The instructed lateral deviation between the longitudinal axis A1 of the motor vehicle 10 (passing through the center of gravity CG) and the avoidance path TO, at a sighting distance "ls" situated ahead of the vehicle, will be denoted "$y_{L\text{-}ref}$" and will be expressed in meters.

The path following error will be denoted "$e_{yL}$" and will be expressed in meters. It will be equal to the difference between the instructed lateral deviation $Y_{L\text{-}ref}$ and the lateral deviation $y_L$.

The aforementioned sighting distance "ls" will be measured from the center of gravity CG and will be expressed in meters.

The slip angle of the motor vehicle 10 (angle made by the velocity vector of the motor vehicle and the longitudinal axis A1 of said vehicle) will be denoted "$\beta$" and will be expressed in rad.

The velocity of the motor vehicle along the longitudinal axis A1 will be denoted "V" and will be expressed in m/s.

The constant "g" will be acceleration due to gravity, expressed in $m \cdot s^{-2}$.

The roll angle adopted by the vehicle with respect to the vertical, expressed in radians, will be denoted $\Phi$.

In the context of calculating this roll angle, the following parameters may be considered:

b$_r$ is the roll damping coefficient, expressed in $N \cdot rad^1 \cdot s^{-1}$, k$_r$ is the roll stiffness, expressed in $N \cdot rad^{-1}$, h is the distance between the center of roll of the vehicle and the ground.

The lateral acceleration experienced by the vehicle along the axis Y will be denoted a$_y$ and will be expressed in $m \cdot s^{-2}$.

The mean curvature of the road at the motor vehicle will be denoted $\rho_{ref}$ and will be expressed in $m^{-1}$. This curvature is equal to the inverse of the radius of curvature of an arc of a circle formed by the road at the precise location of the center of gravity of the motor vehicle.

The constants "$\xi$" and "$\omega$" will represent dynamic characteristics of the steering angle of the front wheels of the vehicle, and more specifically $\xi$ represents the damping and $\omega$ is the natural frequency of the electric power assisted steering (EPAS).

The constant "$\omega_f$" will itself represent a dynamic characteristic of a value-limited arbitrary disturbance "w" applied to the vehicle.

The steering rate will denote the angular velocity of steering angle applied to the steered front wheels.

By way of assumption, for the clarity of the explanation, the road on which the motor vehicle is traveling is assumed to be flat and horizontal.

Before a description is given of the method that will be executed by the computer 13 in order to implement the invention, the calculations that led to the establishment of the algorithms used for implementing the invention will be described, so as to provide a clear understanding of where these algorithms originated from and what underpins them.

First, it will be noted here that, to simplify the explanation, only the assisted steering will be used to cause the vehicle to deviate from its initial path. Differential braking will not be installed or activated.

Figure 5:
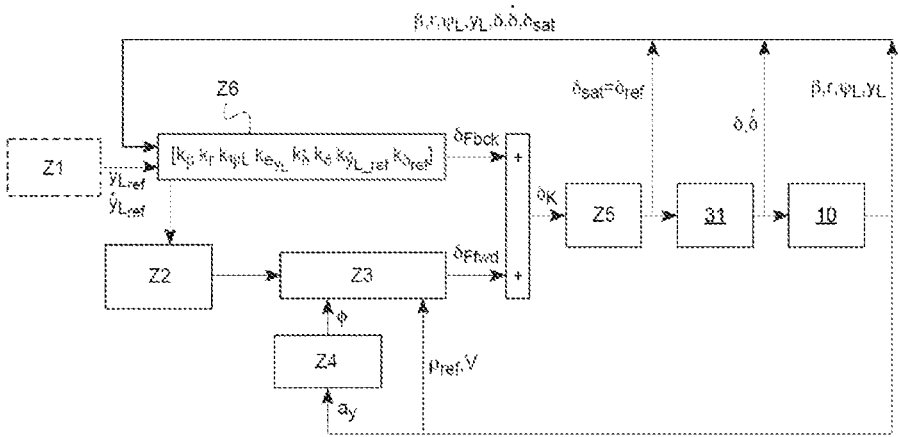
FIG. 5 is a block diagram illustrating the various algorithms involved in implementing the method according to the invention.

FIG. 5 models the process of calculating the saturated steering angle instruction $\delta_{ref}$ to be transmitted to the assisted steering actuator 31.

In summary, provision is made for the controller to determine a path to be followed, to determine a first steering angle instruction (hereinafter referred to as an unsaturated steering angle instruction $\delta_K$) taking account of this path and of parameters connected with the dynamics of the vehicle, and to then saturate this instruction in order to obtain the saturated steering angle instruction $\delta_{ref}$ that is to be transmitted to the actuator 31.

In FIG. 5, the block Z1 corresponds to the block for determining the path that is to be followed in order to avoid the obstacle 20.

The obstacle 20 may be in the same lane as the motor vehicle 10 or in the adjacent lane, provided that it lies on the initial path of the vehicle at a distance that is short in comparison with the speed of the vehicle.

The way in which this avoidance path T0 is determined does not form part of the subject matter of the present invention and is not described here. It must merely be remembered that this block Z1 makes it possible, when the AES function is activated, to determine a lateral deviation instruction $y_{L\text{-}ref}$ and the time-derivative thereof. It will be noted that this avoidance path TO will be considered here to be static but that, in an alternative, a dynamic path (which is recalculated as a function of new obstacles detected or as a function of the actual path followed by the vehicle) may be employed.

The block Z6 illustrates the controller $K_{Fbck}$ that would be usable and reliable if the motor vehicle 10 were driving in a straight line. This controller corresponds to a mathematical operator able to calculate a temporary steering angle instruction (hereinafter referred to as the first component $\delta_{Fbck}$ of the unsaturated steering angle instruction $\delta_K$) allowing the wheels of the vehicle to be steered in such a way that the vehicle follows the avoidance path T0.

The blocks Z2, Z3 and Z4 illustrate algorithms that make it possible to calculate a correction term to be applied to the first component $\delta_{Fbck}$ to take account of the impact of the rolling of the vehicle on its path. This correction term will be referred to hereinafter as the second component $\delta_{Ffwd}$ of the unsaturated steering angle instruction $\delta_K$.

The unsaturated steering angle instruction $\delta_K$ can be calculated by summing the first component $\delta_{Fbck}$ and the second component $\delta_{Ffwd}$.

The block Z5 illustrates a constant that it is desired to apply to the unsaturated steering angle instruction $\delta_K$.

This constraint here is a limit on the rate at which the steering wheel is turned. Effectively, it is desirable here for the angular velocity at which the steering wheel is turned should not exceed a threshold denoted $\nu$, so as to make the vehicle controllable if the driver needed to take back control of the steering of the vehicle during the obstacle avoidance phase.

Other constraints might be conceivable. By way of example, a constraint regarding the amplitude saturation of the steering angle could be employed. However, here, for the clarity of the explanation, this second constraint will not be envisioned. As a further alternative, it would also be possible to anticipate no constraint.

The block Z5 therefore here makes it possible to provide a saturated steering angle instruction hereinafter referenced $\delta_{sat}$. Since this saturated instruction also serves as a reference for controlling the assisted steering actuator 31, it will also be referenced $\delta_{ref}$.

The calculations that have led to the invention may now be described.

The steering of the front wheels 11 of the vehicle may be modeled simply using the following mathematical formula.

$$\begin{pmatrix} \ddot{\delta} \\ \dot{\delta} \end{pmatrix} = \begin{bmatrix} -2\xi\omega & -\omega^2 \\ 1 & 0 \end{bmatrix}\begin{pmatrix} \dot{\delta} \\ \delta \end{pmatrix} + \begin{pmatrix} \omega^2 \\ 0 \end{pmatrix}\delta_{ref}$$

First of all, consider the assumption whereby the curvature of the road being taken is zero. Thus, if the rolling and the curvature of the road are not taken into consideration, the dynamic behavior of the vehicle can be modeled using the following equation.

$$\begin{pmatrix} \dot{\beta} \\ \dot{r} \\ \dot{\psi}_L \\ \dot{y}_L \end{pmatrix} = \begin{bmatrix} -\dfrac{C_f + C_r}{mv} & -1 + \dfrac{C_r l_r - C_f l_f}{mv^2} & 0 & 0 \\ -\dfrac{C_f l_f - C_r l_r}{J} & -\dfrac{C_r l_r^2 + C_f l_f^2}{Jv} & 0 & 0 \\ 0 & 1 & 0 & 0 \\ v & l_s & v & 0 \end{bmatrix}\begin{pmatrix} \beta \\ r \\ \psi_L \\ y_L \end{pmatrix} + \begin{bmatrix} 0 \\ 0 \\ -v \\ 0 \end{bmatrix}\rho_{ref} + \begin{bmatrix} \dfrac{C_f}{mv} \\ \dfrac{C_f l_f}{J} \\ 0 \\ 0 \end{bmatrix}\delta \qquad \text{[Math. 2]}$$

This modeling of the behavior of the vehicle is known as the "bicycle model" because it does not take into account the fact that each axle of the vehicle comprises not one, but two wheels. However, it does lead to a good model of the path of the vehicle as a function of the steering angle of its steered wheels (in this instance the front wheels) when the vehicle is traveling in a straight line.

Figure 3:
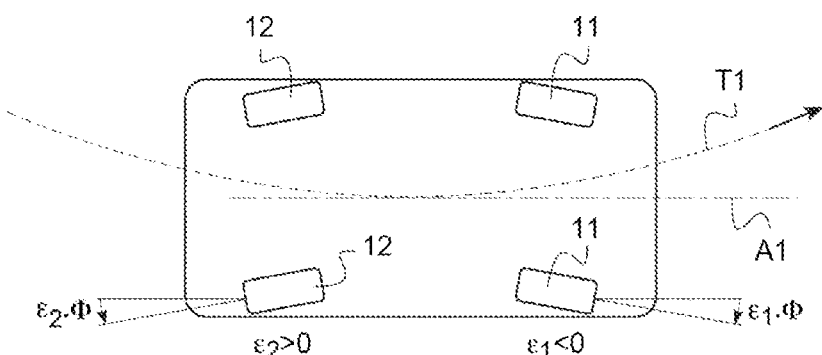
FIG. 3 is a schematic view from above of the motor vehicle of FIG. 1, showing the influence that the rolling has on the path of the vehicle.

However, as FIG. 3 shows, the rolling adopted by the motor vehicle 10 in a bend has an influence on the actual path of the vehicle, which means that it is desirable to take this into account.

Here, the rolling can be defined by an angle, hereinafter referred to as the "roll angle "$\Phi$", that measures the angle of inclination of the vehicle body caused by the road about the longitudinal axis A1 of this vehicle.

The coefficient of steering induced by the rolling on the front wheel set of the vehicle will be denoted $\varepsilon_1$. Once this has been multiplied by the roll angle $\Phi$, it will make it possible to evaluate the extent to which this rolling modifies the steering angle of the front wheels of the vehicle and therefore the path T1 indicated in FIG. 3.

The coefficient of steering induced by rolling on the rear wheel set will be denoted $\varepsilon_2$. Once this has been multiplied by the roll angle $\Phi$, it will make it possible to evaluate the extent to which this rolling modifies the steering angle of the rear wheels.

As FIG. 3 shows, the rolling effectively has a tendency to cause the vehicle to deviate from its path.

In order to take this phenomenon into account, the bicycle model set out hereinabove is improved by means of the following equation.

$$\begin{pmatrix} \dot{\beta} \\ \dot{r} \\ \dot{\psi}_L \\ \dot{y}_L \end{pmatrix} = \begin{bmatrix} -\dfrac{C_f + C_r}{mv} & -1 + \dfrac{C_r l_r - C_f l_f}{mv^2} & 0 & 0 \\ -\dfrac{C_f l_f - C_r l_r}{J} & -\dfrac{C_r l_r^2 + C_f l_f^2}{Jv} & 0 & 0 \\ 0 & 1 & 0 & 0 \\ v & l_s & v & 0 \end{bmatrix}\begin{pmatrix} \beta \\ r \\ \psi_L \\ y_L \end{pmatrix} + \qquad \text{[Math. 3]}$$

$$\begin{bmatrix} 0 \\ 0 \\ -v \\ 0 \end{bmatrix}\rho_{ref} + \begin{bmatrix} \dfrac{C_f}{mv} \\ \dfrac{C_f l_f}{J} \\ 0 \\ 0 \end{bmatrix}(\delta + \varepsilon_1\phi) + \begin{bmatrix} \dfrac{C_r}{mv} \\ -\dfrac{C_r l_r}{J} \\ 0 \\ 0 \end{bmatrix}\varepsilon_2\phi$$

At this stage, it may be noted that the roll angle $\Phi$ may be measured or estimated. Here it will be modeled by the following equation.

$$I_x\ddot{\phi} + b_r\dot{\phi} + k_r\phi = ma_yh + mgh\phi \qquad \text{[Math. 4]}$$

It could therefore be estimated using a Kalman filter. However, here, it is estimated more simply in block Z4 of FIG. 5, using the following equation:

$$\phi = \dfrac{ma_yh}{k_r - mgh} \qquad \text{[Math. 5]}$$

In order to establish this equation, it has been considered that the variation in roll and the roll acceleration are substantially zero. Effectively, for most of the time, the vehicle is more or less in an established bend and so the dynamics of the roll (the derivatives thereof) is substantially zero.

Here, it is sought to ensure correct path following by minimizing the path following error $e_{yL}$, which, it will be recalled, can be expressed by means of the following equation.

$$e_{yL} = y_L - y_{L\_ref} \qquad \text{[Math. 6]}$$

In this embodiment of the invention, it is assumed that the dynamics of the reference path are represented by the equation below:

$$\ddot{y}_{L\_ref} = -\omega_f \dot{y}_{L\_ref} + \omega_f w \qquad \text{[Math. 7]}$$

The bicycle model hitherto described does not, however, make it possible to limit the steering rate of the front wheels 11 of the vehicle. Now, such limitations prove to be particularly important in ensuring that the driver of the vehicle will be able to take back control of the vehicle at any moment.

The saturation of the steering rate illustrated in FIG. 5 by the block Z5 can be written as an equation as follows:

$$\left| \dot{\delta}_{ref} \right| \leq v \qquad \text{[Math. 8]}$$

In this equation, the threshold $v$ is for example equal to 0.0491 Rad/s, which corresponds to 0.785 Rad/s at the steering wheel (which is to say 45°/s) if the gearing ratio for the steering is equal to 16.

Figure 6:
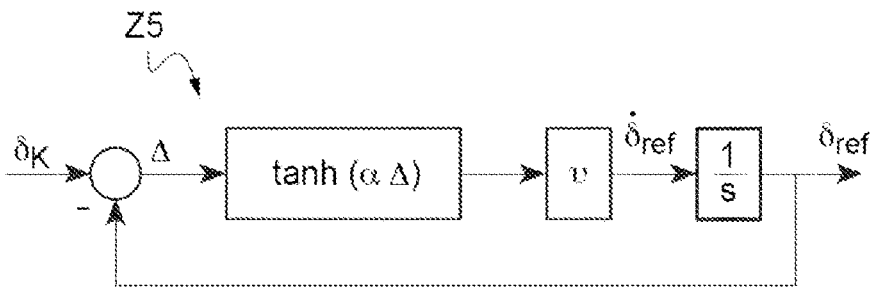
FIG. 6 is a diagram illustrating a transfer function used for implementing a method according to the invention.

As shown in FIG. 6, the steering rate limiter used here is specific insofar as it forms a closed loop pseudo controller which comprises:

a direct-chain transfer function equal to the product of the threshold $v$ (in order to conform to the condition prescribed by the abovementioned question), of an integrator in 1/s, and of a corrector which is a function in the form of a hyperbolic tangent of $\Delta \cdot \alpha$, an indirect-chain (or feedback-chain) transfer function equal to one.

As input it receives the unsaturated steering angle instruction $\delta_K$ and as output transmits the saturated steering angle instruction $\delta_{ref}$.

In this figure, the coefficient $\Delta$ corresponds to the deviation between the variables $\delta_K$ and $\delta_{ref}$. The coefficient $\alpha$ is a constant comprised between 0 and infinity, and is the only parameter able to influence the rapid or soft nature of the steering rate limiter.

This steering rate limiter thus has the advantage of being simple to optimize since all that is required is the setting of the coefficient $\alpha$. It provides continuous and smooth (infinitely differentiable) control.

Thus, taking account of the form of this steering rate limiter, the following equation can be written:

$$\dot{\delta}_{ref} = v \cdot \tanh(a(\delta_K - \delta_{ref}))$$

This then yields a mode of the controllability of the vehicle, which is pseudolinear.

It is then actually possible to introduce the following parameter $\theta$:

$$\theta = \frac{\tanh(\alpha \cdot (\delta_K - \delta_{ref}))}{\alpha \cdot (\delta_K - \delta_{ref})} \qquad \text{[Math. 10]}$$

Then to rewrite the aforementioned equation in linear form:

$$\dot{\delta}_{ref} = -v \cdot \alpha \cdot \theta \cdot \delta_{ref} + v \cdot \alpha \cdot \theta \cdot \delta_K \qquad \text{[Math. 11]}$$

This equation is characteristic of a state representation and shows that the instruction variation limiter model is linear as a function of the parameter $\theta$.

It is then possible, on this basis, to determine the controller $K_{Fbck}$, which, it will be recalled, ensures correct following of the avoidance path TO, but does not take account of the rolling adopted by the vehicle.

Taking account of the aforementioned equations, the bicycle model could be further enhanced to obtain a new usable model. This new enhanced model can be written:

$$
\begin{Bmatrix} \dot{\beta} \\ \dot{r} \\ \dot{\psi}_L \\ \dot{e}_{yL} \\ \ddot{\delta} \\ \dot{\delta} \\ \ddot{y}_{L_{ref}} \\ \dot{\delta}_{ref} \end{Bmatrix}
\begin{bmatrix}
-\dfrac{C_f + C_r}{mV} & -1 + \dfrac{C_r l_r - C_f l_f}{mV^2} & 0 & 0 & 0 & \dfrac{C_f}{mV} & 0 & 0 \\
-\dfrac{C_f l_f - C_r l_r}{J} & -\dfrac{C_r l_r^2 + C_f l_f^2}{JV} & 0 & 0 & 0 & \dfrac{C_f l_f}{J} & 0 & 0 \\
0 & 1 & 0 & 0 & 0 & 0 & 0 & 0 \\
V & l_s & V & 0 & 0 & 0 & -1 & 0 \\
0 & 0 & 0 & 0 & -2\xi\omega & -\omega^2 & 0 & \omega^2 \\
0 & 0 & 0 & 0 & 1 & 0 & 0 & 0 \\
0 & 0 & 0 & 0 & 0 & 0 & -\omega_f & 0 \\
0 & 0 & 0 & 0 & 0 & 0 & 0 & -va\theta
\end{bmatrix} \qquad \text{[Math. 12]}
$$

$$
\begin{Bmatrix} \beta \\ r \\ \psi_L \\ e_{yL} \\ \dot{\delta} \\ \delta \\ \dot{y}_{L_{ref}} \\ \delta_{ref} \end{Bmatrix}
+
\begin{bmatrix} 0 \\ 0 \\ 0 \\ 0 \\ 0 \\ 0 \\ 0 \\ va\theta \end{bmatrix} \delta_K
+
\begin{bmatrix} 0 \\ 0 \\ -V \\ 0 \\ 0 \\ 0 \\ 0 \\ 0 \end{bmatrix} \rho_{ref}
+
\begin{bmatrix} \dfrac{\varepsilon_1 C_f + \varepsilon_2 C_r}{mv} \\ \dfrac{\varepsilon_1 C_f l_f - \varepsilon_2 C_r l_r}{J} \\ 0 \\ 0 \\ 0 \\ 0 \\ 0 \\ 0 \end{bmatrix} \phi
+
\begin{bmatrix} 0 \\ 0 \\ 0 \\ 0 \\ 0 \\ 0 \\ \omega_f \\ 0 \end{bmatrix} w_{y_{ref}}
$$

$$\begin{pmatrix} \dot{\beta} \\ \dot{r} \\ \dot{\psi}_L \\ \dot{e}_{y_L} \\ \ddot{\delta} \\ \dot{\delta} \\ \ddot{y}_{ref} \\ \dot{\delta}_{ref} \end{pmatrix} =$$

$$\begin{bmatrix} -\dfrac{c_f + c_r}{mV} & -1 + \dfrac{c_r l_r - c_f l_f}{mV^2} & 0 & 0 & 0 & \dfrac{C_f}{mV} & 0 & 0 \\[2mm] -\dfrac{c_f l_f - c_r l_r}{l} & -\dfrac{c_r l_r^2 + c_f l_f^2}{lV} & 0 & 0 & 0 & \dfrac{C_f l_f}{l} & 0 & 0 \\[2mm] 0 & 1 & 0 & 0 & 0 & 0 & 0 & 0 \\ V & 1 & 0 & 0 & 0 & 0 & 0 & 0 \\ 0 & 0 & 0 & 0 & -2\xi\omega & -\omega^2 & 0 & \omega^2 \\ 0 & 0 & 0 & 0 & 2 & 0 & 0 & 0 \\ 0 & 0 & 0 & 0 & 0 & 0 & -\omega_f & 0 \\ 0 & 0 & 0 & 0 & 0 & 0 & 0 & -va\theta \end{bmatrix}$$

$$\begin{pmatrix} \beta \\ r \\ \psi_L \\ e_{y_L} \\ \delta \\ \delta \\ y_{ref} \\ \delta_{ref} \end{pmatrix} + \begin{bmatrix} 0 \\ 0 \\ 0 \\ 0 \\ 0 \\ 0 \\ 0 \\ va\theta \end{bmatrix} \delta_k + \begin{bmatrix} 0 \\ 0 \\ -V \\ 0 \\ 0 \\ 0 \\ 0 \\ 0 \end{bmatrix} \rho_{ref} + \begin{bmatrix} \dfrac{\varepsilon_1 C_f + \varepsilon_2 C_r}{mv} \\[2mm] \dfrac{\varepsilon_1 C_f l_f - \varepsilon_2 C_r l_r}{0} \\ 0 \\ 0 \\ 0 \\ 0 \\ 0 \end{bmatrix} \phi + \begin{bmatrix} 0 \\ 0 \\ 0 \\ 0 \\ 0 \\ 0 \\ \omega_f \\ 0 \end{bmatrix} w_{y_{ref}}$$

It will be recalled that it is possible to write $$\delta_K = \delta_{Fbck} + \delta_{Ffwd} \qquad \text{[Math. 13]}$$

Through this equation, it is indeed illustrated that the unsaturated steering instruction $\delta_K$ can be obtained using a first controller $K_{Fbck}$ and a correction term that takes account of the influence of the rolling on the path of the vehicle.

First of all, the controller $K_{Fbck}$, which is of a "feedback" (or closed loop) type makes it possible to determine the first component $\delta_{Fbck}$ in such a way as to ensure the stability and robustness of the closed loop. In a second phase, the correction term (calculated in open loop or using "feed forward") makes it possible to determine the second component $\delta_{Ffwd}$ to compensate for the effects of the curvature of the road and the effects of the rolling (which is induced by the curvature of the road) on the nominal performance of the controller $K_{Fbck}$.

It can thus first of all be considered how the controller $K_{Fbck}$ is made up.

It is possible to write:

$$\delta_{Fbck} = \begin{bmatrix} k_\beta & k_r & k_{\psi_L} & k_{e_{y_L}} & k_\delta & k_\delta & k_{y_{L\_ref}} & k_{\delta_{ref}} \end{bmatrix} \begin{pmatrix} \beta \\ r \\ \psi_L \\ e_{y_L} \\ \delta \\ \delta \\ \dot{y}_{L\_ref} \\ \delta_{ref} \end{pmatrix} \qquad \text{[Math. 14]}$$

where $$k_\beta, k_r, k_{\psi_L}, k_{e_{y_L}}, k_{\delta}, k_\delta, k_{\dot{y}_{Lref}}$$

and $k_{\delta_{ref}}$ are the "gains" of the control er $K_{Fbck}$. This controller $K_{Fbck}$ is calculated on the assumption that the curvature and the rolling are negligible. Its purpose is to guarantee the stability of the closed loop and to minimize the impact that the disturbance $w_{y_{ref}}$ has on the reference avoidance path following. Specifically, the overall controller is divided into two parts: on the one hand, the "feedback" part which guarantees the stability and the reference path following in nominal instances (with no curvature effect) and, on the other hand, the "feedforward" part which compensates for the effect of the curvature in order to achieve the same performance (as in the case of a road with no curvature).

It is then possible to consider a state vector x, which is written in the form:

$$x = \begin{pmatrix} \beta_r \Psi_L e_{y_L} \delta \delta \dot{y}_{L\_ref} \delta_{ref} \end{pmatrix}^T \qquad \text{[Math. 15]}$$

The objective then is to determine the form of the controller $K_{Fbck}$. To do that, our behavioral model can be written in a generic form:

$$\begin{cases} \dot{x} = A(\theta)x + B_u(\theta) \cdot \delta_{ref} + B_w w \\ \qquad y = C_y \cdot x \end{cases} \qquad \text{[Math. 16]}$$

In this equation, $C_y$ is the identity matrix, A is a dynamic matrix, $B_u$ is a control matrix and $B_w$ is a disturbance matrix, that can be written in the form:

$$A = \begin{bmatrix} -\dfrac{C_f + C_r}{mV} & -1 + \dfrac{C_r l_r - C_f l_f}{mV^2} & 0 & 0 & 0 & \dfrac{C_f}{mV} & 0 & 0 \\[2mm] -\dfrac{C_f l_f - C_r l_r}{J} & -\dfrac{C_r l_r^2 + C_f l_f^2}{JV} & 0 & 0 & 0 & \dfrac{C_f l_f}{J} & 0 & 0 \\[2mm] 0 & 1 & 0 & 0 & 0 & 0 & 0 & 0 \\ V & l_s & V & 0 & 0 & 0 & -1 & 0 \\ 0 & 0 & 0 & 0 & -2\xi\omega & -\omega^2 & 0 & \omega^2 \\ 0 & 0 & 0 & 0 & 1 & 0 & 0 & 0 \\ 0 & 0 & 0 & 0 & 0 & 0 & -\omega_f & 0 \\ 0 & 0 & 0 & 0 & 0 & 0 & 0 & -va\theta \end{bmatrix}, \qquad \text{[Math. 17]}$$

-continued $$
B_u = \begin{bmatrix} 0 \\ 0 \\ 0 \\ 0 \\ 0 \\ 0 \\ 0 \\ v\alpha\theta \end{bmatrix}, \, B_w = \begin{bmatrix} 0 \\ 0 \\ 0 \\ 0 \\ 0 \\ 0 \\ \omega_f \\ 0 \end{bmatrix}
$$

The controller $K_{Fbck}$, which is defined as being a static state feedback may itself be expressed in the form:

$$
\delta_{Fbck} = K_{Fbck} \cdot x \qquad\qquad \text{[Math. 18]}
$$

In order to find an optimal controller $K_{Fbck}$, there are various methods that may be used.

The method used here is that of linear matrix inequalities. It is thus performed using convex optimization criteria with linear matrix inequality constraints.

The objective is more specifically to optimize the gains of the closed loop defined by the controller $K_{Fbck}$ by altering the choice of poles.

There are three matrix inequations and these are defined by the following inequations.

$$
A_iQ + B_iR + (A_iQ + B_iR)^T + 2\mu Q < 0 \qquad \text{[Math. 19]}
$$

$$
\begin{bmatrix} -\gamma Q & A_iQ + B_iR \\ * & -\gamma Q \end{bmatrix} < 0 \qquad \text{[Math. 20]}
$$

$$
\begin{bmatrix} \sin(\varphi)(A_iQ + B_iR + (A_iQ + B_iR)^T) & \cos(\varphi)(A_iQ + B_iR - (A_iQ + B_iR)^T) \\ * & \sin(\varphi)(A_iQ + B_iR + (A_iQ + B_iR)^T) \end{bmatrix} < 0 \quad \text{[Math. 21]}
$$

In these inequations the suffix i is equal to 1 or 2 and the matrices $A_i$ and $B_i$ can therefore be defined as follows:

$$
A1 = A(\theta_{min}), \, A2 = A(\theta_{max}), \, B_1 = B_u(\theta_{min}), \, B_2 = B_u(\theta_{max}) \qquad \text{[Math. 22]}
$$

A matrix of the form $$
\begin{bmatrix} X & Y \\ Y^T & W \end{bmatrix}
$$

is written in the form $$
\begin{bmatrix} X & Y \\ * & W \end{bmatrix}
$$

The controller $K_{Fbck}$ is defined by the equation:

$$
K_{Fbck} = R \cdot Q^{-1} \qquad\qquad \text{[Math. 23]}
$$

The vehicle speed is assumed to be constant (and therefore all the matrices in the system are considered to be constant).

Figure 4:
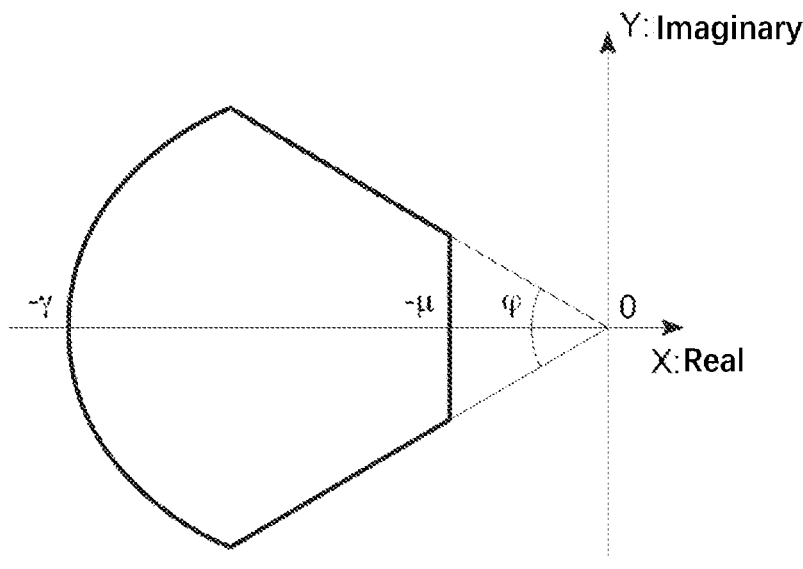
FIG. 4 is a graph illustrating the parameters that can be used to stabilize a closed loop transfer function used in the context of a method according to the invention.

The three inequations make it possible to ensure that the dynamics of the closed loop remain limited. Specifically, by virtue of these constraints, the poles of the closed loop are value-limited to a zone defined by a radius $\gamma$, a minimum distance with respect to the imaginary axis $\mu$, and an aperture angle $\varphi$ (see FIG. 4).

This method proves effective when the issue is one of determining the steering wheel angle at any time in a way that is reasonable (and can be mastered by a driver of average skill) and in a manner that is achievable by the actuator. These constraints also ensure the stability of the closed loop.

The objective here is to minimize the radius $\gamma$. Once the gains of the controller $K_{Fbck}$ have been obtained, the result of the controller can be obtained or calculated by means of the following formula:

$$
\delta_{Fbck} = \begin{bmatrix} k_\beta & k_r & k_{\psi_L} & k_{e_{y_L}} & k_{\dot\delta} & k_\delta & k_{\dot y_{L\_ref}} & k_{\delta_{sat}} \end{bmatrix} \begin{pmatrix} \beta \\ r \\ \psi_L \\ e_{y_L} \\ \dot\delta \\ \delta \\ \dot y_{L\_ref} \\ \delta_{ref} \end{pmatrix} \qquad \text{[Math. 24]}
$$

The values $\theta_{min}$ and $\theta_{max}$ have been introduced into the three matrix inequations.

The value of $\theta$, which is connected to the deviation between $\delta_K$ and $\delta_{ref}$, reflects the extent to which the controller $K_{Fbck}$ violates the controllability limit stated by equation [Math.8].

By definition $\theta$ is comprised between 0 (exclusive) and 1 (inclusive). When $\theta$ is equal to 1, the calculated unsaturated steering wheel angle instruction $\delta_K$ does indeed respect the controllability limit. When it is close to zero, the calculated unsaturated steering wheel angle instruction $\delta_K$ has a value that imposes far too high a steering dynamic, generating a risk of vehicle instability. When $\theta$ adopts intermediate values between 0 and 1, the controllability limit is not respected but it is possible that there will be no risk of vehicle instability.

In other words, the choice of the values $\theta_{min}$ and $\theta_{max}$ has a direct impact on the performance and on the robustness of the controller $K_{Fbck}$. The wider the range $(\theta_{min}\ \theta_{max})$, the lower the performance of the controller $K_{Fbck}$, although this controller is more robust. By contrast, the narrower this range, the better the performance of the controller $K_{Fbck}$, although it is less robust.

Logically, the value $\theta_{max}$ is chosen to be equal to 1 (the case whereby the controller $K_{Fbck}$ operates in linear mode, as is incidentally generally the case, without violation of the controllability constraint).

Determining the value $\theta_{min}$ on the other hand necessitates a compromise between robustness and performance. Determining this value amounts to imposing a maximum threshold for the deviation, in absolute value, between $\delta_K$ and $\delta_{ref}$.

In a bend, the dual effect of the curvature and of the rolling starts to have a greater impact on the performance of the controller $K_{Fbck}$.

The invention therefore proposes calculating the second component $\delta_{Ffwd}$ in order to compensate for the effect of the curvature and that of the rolling so as to maintain a good level of following of the avoidance path TO.

This second component $\delta_{Ffwd}$ may be calculated in each avoidance phase or just once for phases that occur on curved roads (when the radius of curvature of the road is below a predetermined threshold), the curvature of the road being derived for example from data perceived by a camera.

As is clearly apparent in FIG. 5, in order to obtain this second component $\delta_{Ffwd}$, the gains of the controller $K_{Fbck}$ are used.

In practice, the unsaturated steering angle instruction $\delta_K$ is replaced, in equation [Math.12] by its expression derived from equation [Math.13] making it possible to obtain the following equation of a closed loop system.

[Math. 25]

$$
\begin{pmatrix}
\dot{\beta} \\
\dot{r} \\
\dot{\psi}_L \\
\dot{e}_{y_L} \\
\ddot{\delta} \\
\dot{\delta} \\
\ddot{y}_{L_{ref}} \\
\dot{\delta}_{ref}
\end{pmatrix}
=
$$

$$
\begin{bmatrix}
-\dfrac{C_f+C_r}{mV} & -1+\dfrac{C_r l_r - C_f l_f}{mV^2} & 0 & 0 & 0 & \dfrac{C_f}{mV} & 0 & 0 \\
-\dfrac{C_f l_f - C_r l_r}{J} & -\dfrac{C_r l_r^2 + C_f l_f^2}{JV} & 0 & 0 & 0 & \dfrac{C_f l_f}{J} & 0 & 0 \\
0 & 1 & 0 & 0 & 0 & 0 & 0 & 0 \\
V & l_s & V & 0 & 0 & 0 & -1 & 0 \\
0 & 0 & 0 & 0 & -2\xi\omega & -\omega^2 & 0 & \omega^2 \\
0 & 0 & 0 & 0 & 1 & 0 & 0 & 0 \\
0 & 0 & 0 & 0 & 0 & 0 & -\omega_f & 0 \\
k_\beta va\theta & k_r va\theta & k_{\psi_L} va\theta & k_{e_{y_L}} va\theta & k_\delta va\theta & k_{\dot\delta} va\theta & k_{y_{L_{ref}}} va\theta & -va\theta(1-k_{\delta_{sat}})
\end{bmatrix}
$$

$$
\begin{pmatrix}
\beta \\
r \\
\psi_L \\
e_{y_L} \\
\delta \\
\dot\delta \\
\dot{y}_{L_{ref}} \\
\delta_{ref}
\end{pmatrix}
+
\begin{bmatrix}
0 \\ 0 \\ 0 \\ 0 \\ 0 \\ 0 \\ 0 \\ va\theta
\end{bmatrix}
\delta_{Ffwd}
+
\begin{bmatrix}
0 \\ 0 \\ -V \\ 0 \\ 0 \\ 0 \\ 0 \\ 0
\end{bmatrix}
\rho_{ref}
+
\begin{bmatrix}
\dfrac{\varepsilon_1 C_f + \varepsilon_2 C_r}{mv} \\
\dfrac{\varepsilon_1 C_f l_f - \varepsilon_2 C_r l_r}{J} \\
0 \\ 0 \\ 0 \\ 0 \\ 0 \\ 0
\end{bmatrix}
\phi
+
\begin{bmatrix}
0 \\ 0 \\ 0 \\ 0 \\ 0 \\ 0 \\ \omega_f \\ 0
\end{bmatrix}
w_{y_{ref}}
$$

In the knowledge that the disturbance $w_{yref}$ has already been compensated for in the calculation of the component $\delta_{Fbck}$, it will then be merely necessary in calculating the second component $\delta_{Ffwd}$ to minimize the influence of the other disturbances (the curvature and the rolling) on the avoidance path following static error $e_{yL}$.

To do that, first of all, the static state values of the system defined by equation [Math.25], wherein the derivatives are zero, may be calculated and this amounts to solving the following system of equations:

$$\begin{bmatrix} -\dfrac{C_f + C_r}{mV} & -1 + \dfrac{C_r l_r - C_f l_f}{mV^2} & 0 & 0 & 0 & \dfrac{C_f}{mV} & 0 & 0 \\[2ex] -\dfrac{C_f l_f - C_r l_r}{J} & -\dfrac{C_r l_r^2 + C_f l_f^2}{JV} & 0 & 0 & 0 & \dfrac{C_f l_f}{J} & 0 & 0 \\[2ex] 0 & 1 & 0 & 0 & 0 & 0 & 0 & 0 \\ V & l_s & V & 0 & 0 & 0 & -1 & 0 \\ 0 & 0 & 0 & 0 & -2\xi\omega & -\omega^2 & 0 & \omega^2 \\ 0 & 0 & 0 & 0 & 1 & 0 & 0 & 0 \\ 0 & 0 & 0 & 0 & 0 & 0 & -\omega_f & 0 \\ k_\beta va\theta & k_r va\theta & k_{\psi_L} va\theta & k_{e_{y_L}} va\theta & k_{\dot\delta} va\theta & k_\delta va\theta & k_{y_{L\_ref}} va\theta & -va\theta(1 - k_{\delta_{sat}}) \end{bmatrix}$$ [Math. 26]

$$\begin{pmatrix} \beta^{static} \\ r^{static} \\ \psi_L^{static} \\ e_{y_L}^{static} \\ \dot\delta^{static} \\ \delta^{static} \\ y_{L\_ref}^{static} \\ \delta_{ref}^{static} \end{pmatrix} + \begin{bmatrix} 0 \\ 0 \\ 0 \\ 0 \\ 0 \\ 0 \\ 0 \\ va\theta \end{bmatrix} \delta_{Ffwd} + \begin{bmatrix} 0 \\ 0 \\ -V \\ 0 \\ 0 \\ 0 \\ 0 \\ 0 \end{bmatrix} \rho_{ref} + \begin{bmatrix} \dfrac{\varepsilon_1 C_f + \varepsilon_2 C_r}{mv} \\[2ex] \dfrac{\varepsilon_1 C_f l_f - \varepsilon_2 C_r l_r}{J} \\[1ex] 0 \\ 0 \\ 0 \\ 0 \\ 0 \\ 0 \end{bmatrix} \phi = 0$$

Solving this above system of equations makes it possible to calculate the static path following error $e_{y_L}$, as a function of the curvature $\rho_{ref}$ of the road, of the speed V of the motor vehicle 10, of the roll angle $\Phi$, of the gains of the controller $K_{Fbck}$, of the sought-after second component $\delta_{Ffwd}$, and of other parameters relating to the vehicle itself (lf, lr, ε1, ε2, etc.). It is thus possible to write:

$$e_{y_L}^{static} = f(\delta_{Ffwd}, \phi, V, \rho_{ref})$$ [Math. 27]

Thus, in order to find the second component $\delta_{Ffwd}$ that makes it possible to obtain a zero static path following error $e_{y_L}$, it is possible to write the equation below:

$$e_{y_L}^{static} = 0$$ [Math. 28]

It makes it possible to obtain the following equation:

$$\delta_{Ffwd} =$$ [Math. 29]
$$\left[ (l_f + l_r)\left(1 - k_\delta - k_{\delta_{ref}}\right) + \left(k_{\psi_L} - k_\beta\right)l_r + k_{\psi_L}l_s - k_r V + K_V V^2 \right] \cdot$$
$$\rho_{ref} - \left[ \left(1 - k_\delta - k_{\delta_{ref}}\right)\varepsilon_1 - \left(1 - k_\delta - k_{\delta_{ref}} + k_{\psi_L} - k_\beta\right)\varepsilon_2 \right] \cdot \phi$$

In this equation, the term $K_v$ is referred to as the "understeer gradient" and is expressed as:

$$K_V = \left( \frac{l_r\left(1 - k_\delta - k_{\delta_{ref}}\right)}{C_f} - \frac{l_f\left(1 - k_\delta - k_{\delta_{ref}} + k_{\psi_L} - k_\beta\right)}{C_r} \right) \cdot \frac{m}{l_f + l_r}$$ [Math. 30]

This understeer gradient is a coefficient that makes it possible to express and quantify the tendency of the motor vehicle to understeer in a bend at a given speed.

In summary, in order to obtain the second component $\delta_{Ffwd}$, all that is therefore required is to calculate the term $K_v$ using the equation [Math.30](block Z2 in FIG. 5) and then use the equation [Math.29](block Z3).

At this stage it is now possible to describe the method that will be executed by the computer 13 of the motor vehicle 10 in order to implement the invention.

The computer 13 here is programmed to implement this method recursively, which is to say step by step, in a loop.

To do so, during a first step, the computer 13 verifies that the autonomous obstacle avoidance function (AES) is activated.

If it is, it attempts to detect the presence of a potential obstacle lying in the path of the motor vehicle 10. To do that, it uses its RADAR or LIDAR remote sensor.

In the absence of any obstacle, this step is repeated by looping.

As soon as potentially dangerous obstacle 20 is detected (see FIG. 2), the computer 13 plans an avoidance path T0 that allows this obstacle 20 to be avoided.

The computer 13 will therefore seek to define a control instruction for the assisted steering actuator 31, namely the saturated steering angle instruction $\delta_{ref}$ that allows this avoidance path T0 to be followed as closely as possible.

To do that, it begins by calculating or acquiring parameters such as:

the measured steering angle $\delta$, the slip angle $\beta$ of the motor vehicle 10, the derivative with respect to time of the measured steering angle $\delta$, the saturated steering angle instruction $\delta_{ref}$ obtained in the previous time step, the yaw velocity r, the relative heading angle $\Psi$L, and the lateral deviation instruction $y_{Lref}$.

As shown in FIG. 5, the computer 13 then calculates the gains of the controller $K_{Fbck}$, and then from these deduces the value of the first component $\delta_{Fbck}$ of the unsaturated steering angle instruction $\delta_K$.

From this it also deduces the values of the term K, and then of the second component $\delta_{Ffwd}$ of the unsaturated steering angle instruction $\delta_K$.

From this it can then deduce the value of this unsaturated steering angle instruction $\delta_K$ and then that of the saturated steering angle instruction $\delta_{ref}$.

This latter value is then transmitted to the assisted steering actuator 31 in order to cause the vehicle to deviate from its initial path.

The present invention is not in any way restricted to the embodiment described and depicted; rather the person skilled in the art will know how to vary it in any way that is in accordance with the invention.

The invention claimed is:

1. A control method for automated steering of a motor vehicle comprising wheels of which at least two wheels are steered wheels, the method comprising:

acquiring parameters of an avoidance path whereby the motor vehicle avoids an obstacle;

calculating, using a computer, a temporary control instruction that steers the steered wheels via a steering actuator, as a function of said parameters and by a closed loop controller;

acquiring a lateral acceleration or a roll angle experienced by the motor vehicle; and calculating, using an open loop calculation, a correction term that corrects said temporary control instruction, as a function of the lateral acceleration or of the roll angle acquired, wherein the correction term is calculated as a function of a coefficient of steering caused by a roll angle of a front wheelset of the wheels of the motor vehicle and/or of a coefficient of steering caused by the roll angle of the front wheelset of the wheels of the wheels of the motor vehicle.

2. The control method as claimed in claim 1, wherein the correction term is calculated as a function of a curvature of a road taken that the motor vehicle is traveling upon.

3. A control method for automated steering of a motor vehicle comprising wheels of which at least two wheels are steered wheels, the method comprising:

acquiring parameters of an avoidance path whereby the motor vehicle avoids an obstacle;

calculating, using a computer, a temporary control instruction that steers the steered wheels via a steering actuator, as a function of said parameters and by a closed loop controller;

acquiring a lateral acceleration or a roll angle experienced by the motor vehicle; and calculating, using an open loop calculation, a correction term that corrects said temporary control instruction, as a function of the lateral acceleration or of the roll angle acquired, wherein the correction term is calculated as a function of a curvature of a road taken that the motor vehicle is traveling upon, and wherein the correction term is equal to the sum of:

a product of a first variable multiplied by the lateral acceleration or by the roll angle, and a product of a second variable multiplied by the curvature of the road that the motor vehicle is traveling upon.

4. The control method as claimed in claim 1, wherein the correction term is calculated as a function of at least one gain of the closed loop controller.

5. The control method as claimed in claim 1, wherein the correction term is calculated as a function of an understeer gradient.

6. The control method as claimed in claim 5, wherein the understeer gradient is calculated as a function of at least one gain of the closed loop controller.

7. The control method as claimed in claim 1, wherein the correction term is calculated by the following equation:

$$\delta_{Ffwd} = \left[ (l_f + l_r)\left(1 - k_\delta - k_{\delta_{ref}}\right) + \left(k_{\psi_L} - k_\beta\right)l_r + k_{\psi_L}l_s - k_r V + K_V V^2 \right] \cdot$$
$$\rho_{ref} - \left[ \left(1 - k_\delta - k_{\delta_{ref}}\right)\varepsilon_1 - \left(1 - k_\delta - k_{\delta_{ref}} + k_{\psi_L} - K_\beta\right)\varepsilon_2 \right] \cdot \phi$$

where:

$l_f$ is a distance between a center of gravity and a front axle of the motor vehicle, $l_r$ is a distance between a center of gravity and a rear axle of the motor vehicle, V is a longitudinal velocity of the motor vehicle, $l_s$ is a predetermined sighting distance, $\rho_{ref}$ is a radius of curvature of a road that the motor vehicle is traveling upon, $\varepsilon_1$ is a coefficient of steering caused by a roll angle of a front wheelset of the wheels of the motor vehicle, $\varepsilon_2$ is a coefficient of steering caused by a roll angle of a rear wheelset of the wheels of the motor vehicle, $\Phi$ is the roll angle, Kv is an understeer gradient, $k_\delta, k_{\delta_{ref}}, k_{\psi_L}, k_f,$ and $k_\beta$ are gains of the closed loop controller.

8. A motor vehicle comprising:

a steering actuator for steering the steered wheels and a computer configured for controlling said actuators, wherein the computer is programmed to implement the control method as claimed in claim 1.

9. A control method for automated steering of a motor vehicle comprising wheels of which at least two wheels are steered wheels, the method comprising:

acquiring parameters of an avoidance path whereby the motor vehicle avoids an obstacle;

calculating, using a computer, a temporary control instruction that steers the steered wheels via a steering actuator, as a function of said parameters and by a closed loop controller;

acquiring a lateral acceleration or a roll angle experienced by the motor vehicle; and calculating, using an open loop calculation, a correction term that corrects said temporary control instruction, as a function of the lateral acceleration or of the roll angle acquired, wherein the correction term is calculated as a function of an understeer gradient, wherein the understeer gradient is calculated as a function of at least one gain of the closed loop controller, and wherein the understeer gradient is calculated by the following equation:

$$K_V = \left( \frac{l_r\left(1 - k_\delta - k_{\delta_{ref}}\right)}{C_f} - \frac{l_f\left(1 - k_\delta - k_{\delta_{ref}} + k_{\psi_L} - k_\beta\right)}{C_r} \right) \cdot \frac{m}{l_f + l_r},$$

where m is a total mass of the motor vehicle, $C_f$ is a cornering stiffness of a front wheelset of the wheels of the motor vehicle, $C_r$ is a cornering stiffness of a rear wheelset of the wheels of the motor vehicle, $l_f$ is a distance between a center of gravity and a front axle of the motor vehicle, $l_r$ is a distance between a center of gravity and a rear axle of the motor vehicle, and $k_\delta$, $k_{\delta ref}$, $k_{\Psi L}$, and $k_\beta$ are gains of the closed loop controller.

* * * * *